United States Patent
Douglas

(10) Patent No.: US 12,438,721 B2
(45) Date of Patent: Oct. 7, 2025

(54) SYSTEMS AND METHODS FOR LEVERAGING OFFLINE VIRTUAL AUTHENTICATION TOKENS

(71) Applicant: Capital One Services, LLC, McLean, VA (US)

(72) Inventor: Lawrence Douglas, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 117 days.

(21) Appl. No.: 18/391,441

(22) Filed: Dec. 20, 2023

(65) Prior Publication Data
US 2025/0211440 A1      Jun. 26, 2025

(51) Int. Cl.
*H04L 9/32* (2006.01)

(52) U.S. Cl.
CPC .......... *H04L 9/3213* (2013.01); *H04L 9/3226* (2013.01)

(58) Field of Classification Search
None
See application file for complete search history.

(56) References Cited

U.S. PATENT DOCUMENTS

| | | | |
|---|---|---|---|
| 6,883,100 B1* | 4/2005 | Elley ................. | G06F 21/6218 726/5 |
| 10,257,188 B2* | 4/2019 | Anand ................ | H04L 67/306 |
| 10,645,077 B2* | 5/2020 | Paert ................. | H04L 63/0846 |
| 10,693,870 B2* | 6/2020 | Inabe ................. | H04L 63/0853 |
| 10,831,731 B2* | 11/2020 | Botero ............... | G06F 16/22 |
| 10,839,391 B2* | 11/2020 | Madhu ............... | G06Q 20/36 |
| 11,107,066 B1* | 8/2021 | Maeng ............... | G06Q 20/3821 |
| 11,533,184 B2* | 12/2022 | Chen ................. | H04L 9/3236 |
| 12,101,319 B2* | 9/2024 | Momchilov ........ | H04L 63/0853 |
| 12,254,073 B2* | 3/2025 | Badri ................ | G06F 21/33 |
| 2016/0012430 A1* | 1/2016 | Chandrasekaran .... | G06Q 20/00 705/44 |
| 2018/0068293 A1* | 3/2018 | Dunne ............... | G06Q 20/3672 |
| 2021/0042753 A1* | 2/2021 | Wong ................ | G06Q 20/4015 |
| 2021/0065174 A1* | 3/2021 | Singh ................ | G06Q 20/3676 |
| 2023/0269099 A1* | 8/2023 | Medvinsky .......... | H04L 9/3247 713/158 |
| 2024/0223385 A1* | 7/2024 | Jiang ................. | H04L 9/3268 |
| 2024/0333529 A1* | 10/2024 | Metzger ............. | H04L 9/3265 |

* cited by examiner

*Primary Examiner* — Backhean Tiv
(74) *Attorney, Agent, or Firm* — Foley & Lardner LLP

(57) ABSTRACT

Systems and methods are described herein for leveraging offline virtual authentication tokens during periods of inaccessible network connectivity. In some aspects, after determining the system is offline, systems and methods request an authentication code from a user and determine whether the authentication code received from the user is valid. In response to determining that the authentication code is valid, systems and methods select an offline virtual authentication token from the plurality of stored offline virtual authentication tokens associated with the user account.

20 Claims, 4 Drawing Sheets

SYSTEMS AND METHODS FOR LEVERAGING OFFLINE VIRTUAL AUTHENTICATION TOKENS

SUMMARY

In the context of authentication tokens (e.g., hardware security tokens, hardware authentication devices, two-factor authentication devices, or other tokens), when token-derived information (e.g., credentials, identifying information, etc.) is provided to an entity (e.g., a computing device, a website, a server, etc.), the token-derived information may allow a user to access services and other resources permitted with that token based on authentication of a request to access such services or other resources. In an example where the token is retrieved via a mobile device, a token reader may authenticate information from the token (e.g., a credential or a facility code) related to authorizing access to a restricted access point in a building. The credential may be sent to a computer system that makes decisions based on the authentication information. If the credential is included in an access list, the system unlocks the restricted access point. However, in times of inaccessible network connectivity for the mobile device, the token may not be accessible via the mobile device.

Accordingly, methods and systems are described herein for novel uses and/or improvements to information security. As one example, methods and systems are described herein for leveraging offline virtual authentication tokens during periods of inaccessible network connectivity for a mobile device.

Existing systems fail to allow users to leverage virtual authentication tokens during periods of inaccessible network connectivity for the system. For example, existing systems may require the user to have stable network connectivity to access virtual authentication tokens. However, the difficulty in leveraging virtual authentication tokens is that such tokens may require a network connection to maintain security by verifying the user. This allows the system to easily detect fraudulent actions. Without a network connection, it is difficult for the system to perform real-time verification.

To overcome these technical deficiencies, methods and systems disclosed herein after determining the system is offline, request an authentication code from a user, and determine whether the authentication code received from the user is valid. In response to determining that the authentication code is valid, the system selects an offline virtual authentication token from a plurality of stored offline virtual authentication tokens associated with the user account. For example, the system may determine whether there is a stable internet connection before granting an offline badge permission to open a door to a restricted area. In response to determining there is no internet connection, the system verifies the user by requesting a secure code. As a result of receiving the correct code, the system may display the offline badge to give the user access to the desired area. Accordingly, the methods and systems provide for allowing users to utilize offline virtual authentication tokens.

In some aspects, the problems described above may be solved using a system that may perform the following operations. The system may store offline virtual authentication tokens. In particular, the system may store a plurality of offline virtual authentication tokens associated with a user account. For example, the system may store preexisting virtual authentication tokens that require a network connection to gain access to an entity. For instance, a user device may store a set of offline badges to gain access to a restricted area. By doing so, the system allows the user to easily store authentication tokens.

The system may receive an authentication request. In particular, the system may receive from a token reader an authentication request for obtaining resources associated with the user account. The authentication request may include an activity operator and activity data. The activity data comprises location data. For example, the user may attempt to access a restricted area, and before being allowed entrance, the user can receive a request. The request may include the location of the area and may ask the user to verify their access. By doing so, the system ensures only users with permission can access a restricted area.

The system may detect inaccessible network connectivity. In particular, in response to receiving the authentication request, the system may detect inaccessible network connectivity to determine whether a system is offline. For example, the user device may not have access to a network connection to allow the user to utilize their badge to access the restricted area. By doing so, the system is able to determine the user is unable to use their badge.

The system may request an authentication code. In particular, in response to determining the system is offline, the system may request an authentication code from a user. For example, the system may request a password from the user to verify themselves prior to allowing the user to access the virtual authentication tokens. By doing so, the system provides extra security measures.

The system may select an offline virtual authentication token. In particular, in response to determining that the authentication code is valid, the system may select an offline virtual authentication token from the plurality of stored offline virtual authentication tokens associated with the user account. For example, the system may select one badge from the set of offline badges for the user to utilize in accessing the restricted area.

The system may generate a new authentication token. In particular, the system may generate a new authentication token based on the selected offline virtual authentication token. For example, the offline badge can be converted to a new online badge using the same credential information. By doing so, the system may allow the user access to the restricted area during a period of inaccessible network connectivity.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
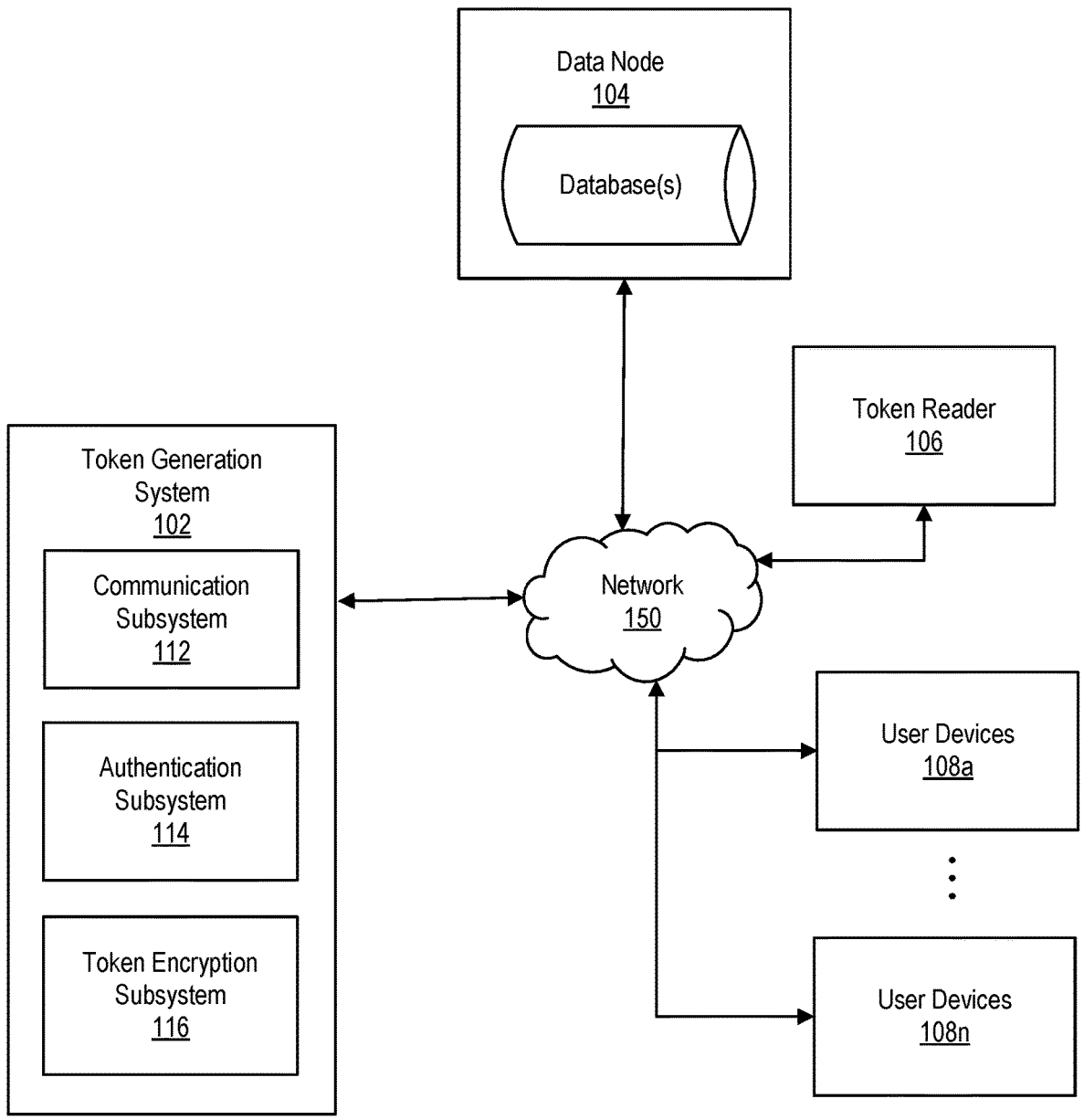
FIG. 1 shows an illustrative diagram for generating offline virtual authentication tokens, in accordance with one or more embodiments.

FIG. 1 shows an illustrative diagram for generating offline virtual authentication tokens, in accordance with one or more embodiments. Environment 100 includes token generation system 102, data node 104, token reader 106, and user devices 108a-108n. Token generation system 102 may include software, hardware, or a combination of both and may reside on a physical server or a virtual server running on a physical computer system (e.g., server 202 described with respect to FIG. 2). In some embodiments, token generation system 102 may be configured on a user device (e.g., a laptop computer, a smartphone, a desktop computer, an electronic tablet, or another suitable user device). Furthermore, token generation system 102 may reside on a cloud-based system and/or interface with computer models either directly or indirectly, for example, through network 150. Token generation system 102 may include communication subsystem 112, authentication subsystem 114, and/or token encryption subsystem 116.

Data node 104 may store various data, including one or more machine learning models, training data, user data profiles, input data, output data, performance data, and/or other suitable data. Data node 104 may include software, hardware, or a combination of the two. In some embodiments, token generation system 102 and data node 104 may reside on the same hardware and/or the same virtual server or computing device. Network 150 may be a local area network, a wide area network (e.g., the internet), or a combination of the two.

User devices 108a-108n may include software, hardware, or a combination of the two. For example, each client device may include software executed on the device or may include hardware such as a physical device. User devices 108a-108n may include user devices (e.g., a laptop computer, a smartphone, a desktop computer, an electronic tablet, or another suitable user device).

Token generation system 102 may receive authentication requests from token reader 106. Token generation system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as activity data or user data. Communication subsystem 112 may communicate with authentication subsystem 114 and token encryption subsystem 116.

Token generation system 102 may include authentication subsystem 114. Communication subsystem 112 may pass at least a portion of the data or a pointer to the data in memory to authentication subsystem 114. Authentication subsystem 114 may include software components, hardware components, or a combination of both. For example, authentication subsystem 114 may include software components or may include one or more hardware components (e.g., processors) that are able to execute operations for processing authentication requests. In some embodiments, an authentication access request may refer to a request from token reader 106 to a server in token generation system 102 to obtain resources. Authentication subsystem 114 may directly access data or nodes associated with user devices 108a-108n and may transmit data to these user devices. Authentication subsystem 114 may, additionally or alternatively, receive data from and/or send data to communication subsystem 112 and token encryption subsystem 116.

Token encryption subsystem 116 may execute tasks relating to processing authentication requests. Token encryption subsystem 116 may include software components, hardware components, or a combination of both. Token encryption subsystem 116 may receive input data as well as data output by user devices 108a-108n. Token encryption subsystem 116 may, additionally or alternatively, receive data from and/or send data to communication subsystem 112 or authentication subsystem 114.

Figure 2:
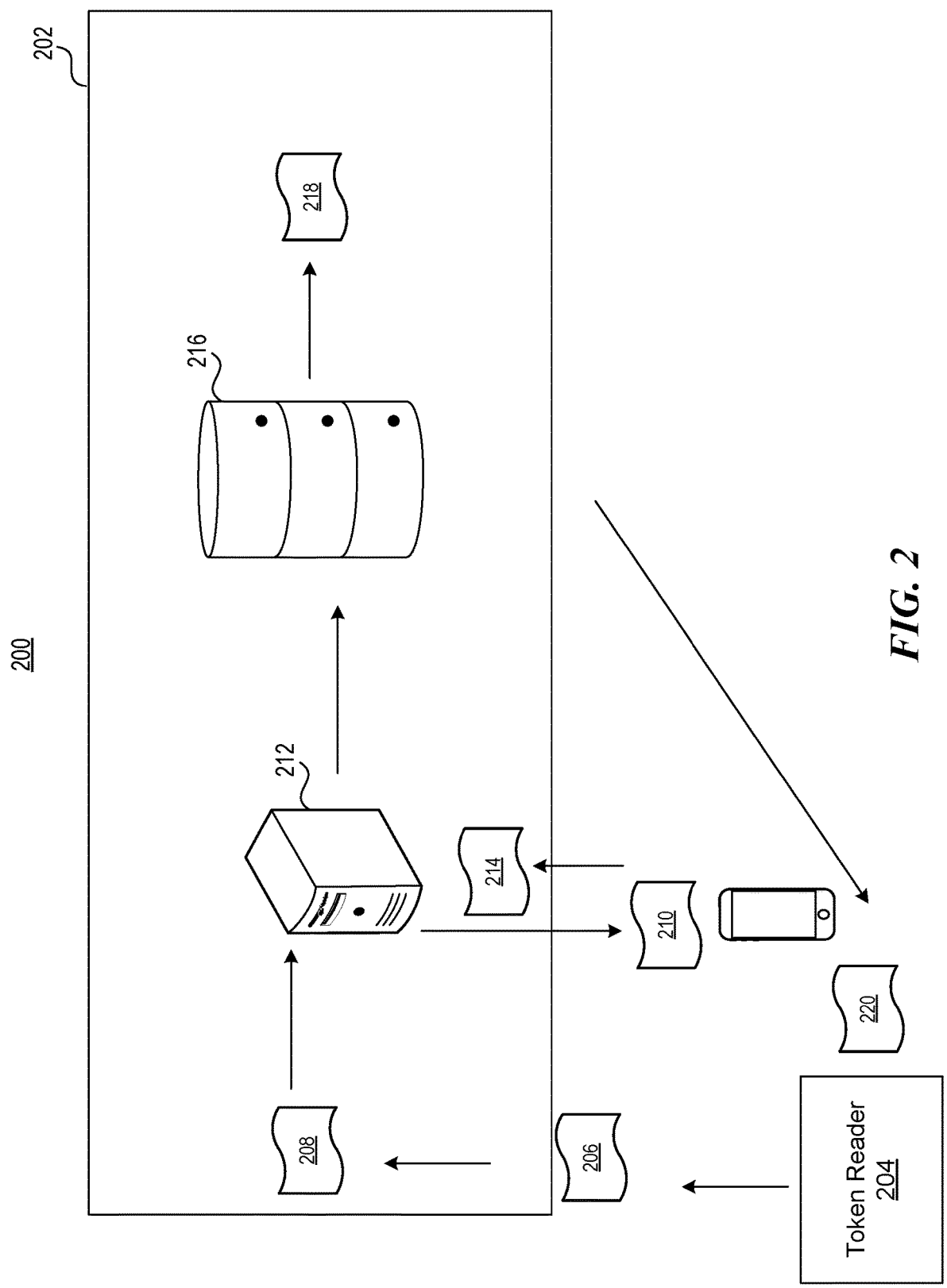
FIG. 2 shows an illustrative diagram for leveraging offline virtual authentication tokens, in accordance with one or more embodiments.

FIG. 2 shows an illustrative diagram for leveraging offline virtual authentication tokens, in accordance with one or more embodiments. FIG. 2 shows environment 200. Environment 200 includes server 202, token reader 204, authentication request 206, status 208, request 210, component 212, authentication code 214, database 216, token 218, and authentication token 220.

Server 202 may store offline virtual authentication tokens. In particular, server 202 may store a plurality of offline virtual authentication tokens associated with a user account. For example, the system may store preexisting virtual authentication tokens that require a network connection to gain access to an entity. For instance, a user device may store a set of offline badges to gain access to a restricted area. In another instance, a user device may store a set of virtual card numbers in database 216 that have not been activated on a mobile application. By doing so, the system allows the user to easily store authentication tokens.

Server 202 may receive an authentication request (e.g., authentication request 206). In particular, the system may receive from a token reader (e.g., token reader 204) an authentication request (e.g., authentication request 206) for obtaining resources associated with the user account. The authentication request (e.g., authentication request 206) may include an activity operator and activity data. The activity data comprises location data. For example, the user may attempt to access a restricted area, and before being allowed entrance, the user can receive a request. The request may include the location of the area and may ask the user to verify their access. In another example, the user may attempt to complete a purchase using an online virtual card number and server 202 may receive the transaction (e.g., authentication request 206). By doing so, the system ensures only users with permission can validate the authentication request.

Server 202 may detect inaccessible network connectivity. In particular, in response to receiving the authentication request (e.g., authentication request 206), server 202 may detect inaccessible network connectivity to determine whether a system is offline. For example, the user device may not have access to a network connection to allow the user to utilize their badge to access the restricted area. In another example, when the user is attempting to complete a purchase with an online virtual card number, server 202 may determine there is a lack of accessible network connectivity. For instance, server 202 may require an internet connection to authenticate and authorize the purchase. However, server 202 may trigger a timeout event (e.g., status 208). In response, server 202 determines network connectivity is inaccessible. By doing so, the system is able to determine the user is unable to access their plurality of stored authentication tokens.

Server 202 may request an authentication code (e.g., request 210). In particular, in response to determining the system is offline, server 202 may request an authentication code from a user (e.g., request 210). For example, the system (e.g., component 212) may request a password from the user to verify themselves prior to allowing the user to access the virtual authentication tokens. In some embodiments, the system may generate the authentication code based on a unique value. For example, server 202 may generate the authentication code based on a starting unique value such as a password, user ID, or timestamp. Server 202 may apply encryption algorithms to the unique value to generate a ciphertext for the authentication code. By doing so, the system provides extra security measures. By doing so, the system may verify the user.

Server 202 may select an offline virtual authentication token (e.g., token 218). In particular, in response to determining that the authentication code (e.g., authentication code 214) is valid, the system (e.g., component 212) may select an offline virtual authentication token (e.g., token 218) from database 216 from the plurality of stored offline virtual authentication tokens associated with the user account. For example, the system may select one badge from the set of offline badges for the user to utilize in accessing the restricted area. In another example, the system may select one virtual card number to complete the purchase from the set of virtual card numbers that have not been activated. In some embodiments, the system may determine whether the authentication code is valid by verifying the new authentication token has a valid checksum. For instance, server 202 may utilize a checksum validation algorithm. Server 202 extracts each digit from the virtual card number except the last digit. After applying weights, server 202 calculates a checksum for the virtual card number. Server 202 may then determine whether the selected virtual card number (e.g., token 218) has a valid checksum. By doing so, the system ensures fraudulent purchases associated with invalid authentication codes are not completed.

In some embodiments, server 202 may, in response to determining that the authentication code (e.g., authentication code 214) is invalid, search the plurality of stored offline virtual authentication tokens for an invalid offline virtual authentication token. In particular, in response to determining that the authentication code (e.g., authentication code 214) is invalid, server 202 may search the plurality of stored offline virtual authentication tokens associated with the user account for an invalid offline virtual authentication token. Then, server 202 may select the stored invalid offline virtual authentication token from database 216 to generate a false authentication token. The invalid offline virtual authentication token may include an invalid checksum. For example, server 202 may utilize a checksum validation algorithm. Server 202 extracts each digit from the virtual card number except the last digit. After applying weights, server 202 calculates a checksum for the virtual card number. Server 202 may then determine whether the selected virtual card number (e.g., token 218) has an invalid checksum by determining the calculated checksum does not match the last digit. By doing so, the system ensures fraudulent purchases associated with invalid authentication codes are not completed.

Server 202 may generate a new authentication token (e.g., authentication token 220). In particular, server 202 may generate a new authentication token (e.g., authentication token 220) based on the selected offline virtual authentication token. For example, the offline badge can be converted to a new online badge using the same credential information. In another example, server 202 may encrypt the selected virtual card number by using encryption algorithms to encode the sensitive information associated with the virtual card number. By doing so, the system may allow the user access to an authentication token during a period of inaccessible network connectivity.

In some embodiments, server 202 may decline the authentication request (e.g., authentication request 206). In particular, server 202 may detect the new authentication token (e.g., authentication token 220) includes an activity limit value. Server 202 may determine whether the activity data includes a value greater than the activity limit value. In response to determining the value is greater than the activity limit value, server 202 may decline the authentication request (e.g., authentication request 206). For example, the system may automatically reject purchases that go over a certain dollar limit.

In some embodiments, server 202 may accept the authentication request (e.g., authentication request 206). In particular, server 202 may detect the new authentication token (e.g., authentication token 220) includes a location threshold. Server 202 may determine whether the location data is within the location threshold. In response to determining the location data is within the location threshold, server 202 may accept the authentication request (e.g., authentication request 206). For example, prior to processing a purchase with the virtual card number, the system may check the location associated with the purchase. If the purchase is associated with a location not within a location threshold, the system may determine the purchase is potential fraud and decline the purchase. Otherwise, the system accepts the purchase (e.g., authentication request 206).

In some embodiments, server 202 may generate a new plurality of offline virtual authentication tokens. In particular, server 202 may determine a threshold period based on a user preference. In response to detecting a threshold period has passed, server 202 may remove the plurality of offline virtual authentication tokens. Server 202 may generate a new plurality of offline virtual authentication tokens. For example, the system may ask the user for a threshold period. The threshold period refers to how often the system should generate new offline virtual card numbers. For instance, the threshold period may refer to 30 days. After 30 days, the system will generate new offline virtual card numbers.

In some embodiments, server 202 may detect accessible network connectivity. In particular, server 202 may detect accessible network connectivity. The accessible network connectivity indicates the system is online. In response to detecting accessible network connectivity, the system may remove the new authentication token (e.g., authentication token 220) and the valid offline virtual authentication token from the user account. For example, the system may deactivate the encrypted virtual card number. By doing so, the system may maintain its security.

In some embodiments, server 202 may retrieve a list of activities associated with the new authentication token (e.g., authentication token 220). In particular, server 202 may retrieve a list of activities associated with the new authentication token (e.g., authentication token 220) from database 216. Each activity on the list of activities includes activity data. The system may determine whether the list of activities associated with the new authentication token (e.g., authentication token 220) is completed. The system may, in response to determining the list of activities is incomplete, forward the list of activities to an active authentication token associated with the user account. For example, the system may ensure that there are no recurring payments that need to be moved onto a new payment source such as an active credit card.

In some embodiments, server 202 may remove the plurality of offline virtual authentication tokens. In particular, server 202 may receive, from a user, a notification indicating that the user account is comprised. The system in response to receiving the notification may remove the plurality of offline virtual authentication tokens from the user account. For example, the user can notify the server that their user account was hacked. The system may then deactivate and delete all the stored offline virtual authentication tokens from database 216.

Figure 3:
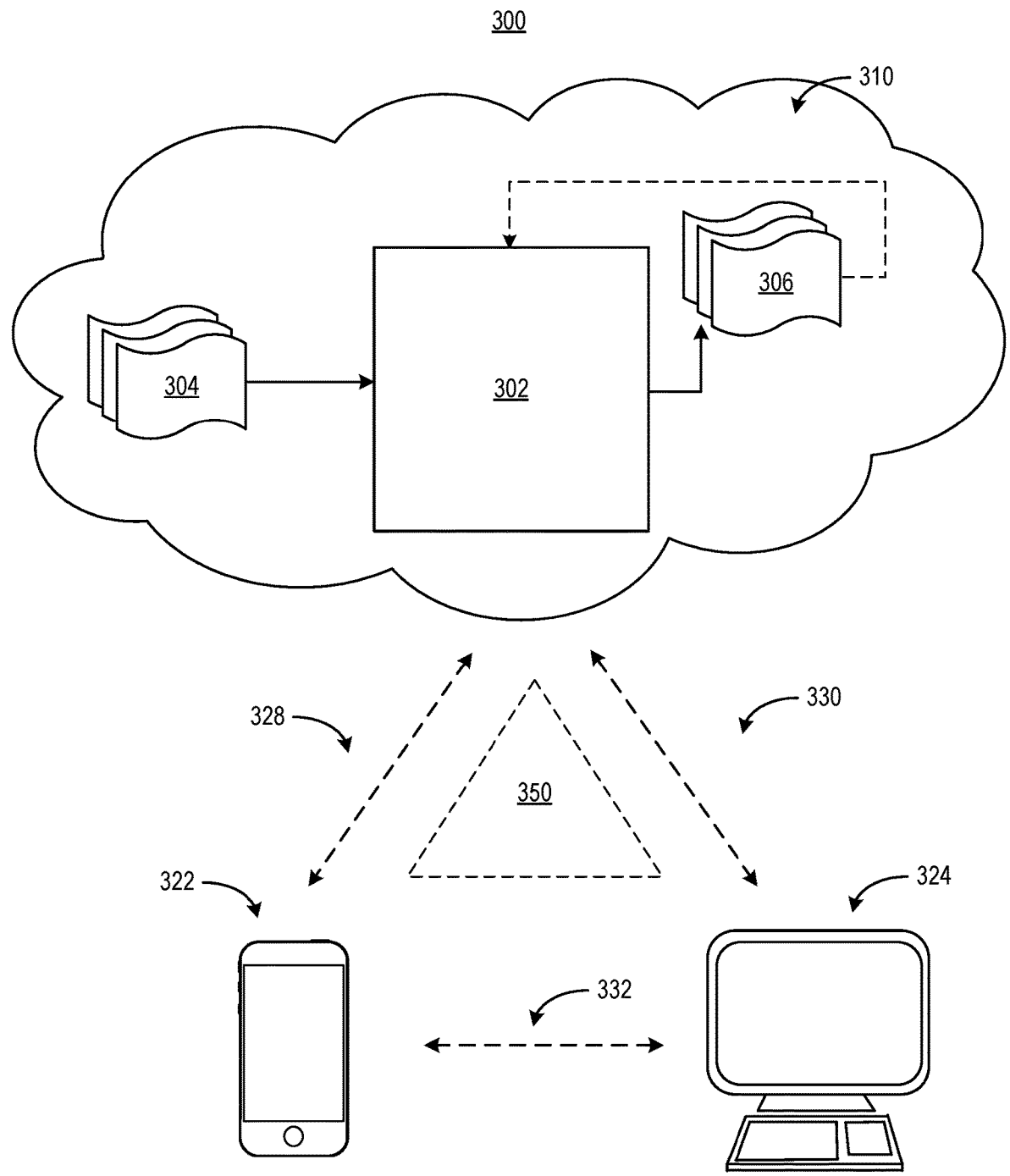
FIG. 3 shows illustrative components for a system used to leverage offline virtual authentication tokens, in accordance with one or more embodiments.

FIG. 3 shows illustrative components for a system used to leverage offline virtual authentication tokens, in accordance with one or more embodiments. For example, FIG. 3 may show illustrative components for allowing users to utilize offline virtual card numbers. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, virtual private networks, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include token generation system 102, communication subsystem 112, authentication subsystem 114, token encryption subsystem 116, data node 104, token reader 106, and user devices 108a-108n. Cloud components 310 may access user devices 108a-108n.

Cloud components 310 may include program 302, which may be a machine learning model, artificial intelligence model, etc. (which may be referred to collectively as "models" herein). Program 302 may take input 304 and provide output 306. The input may include an authentication request. The output may include a request to the user for an authentication code from a user. Alternatively, the output may include the new authentication token. In another embodiment, input 304 may include user preferences, activity data, or location data. The output 306 may include commands to manage the plurality of offline virtual authentication tokens. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to program 302 as input to train program 302 (e.g., alone or in conjunction with user indications of the accuracy of outputs 306, labels associated with the inputs, or other reference feedback information).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
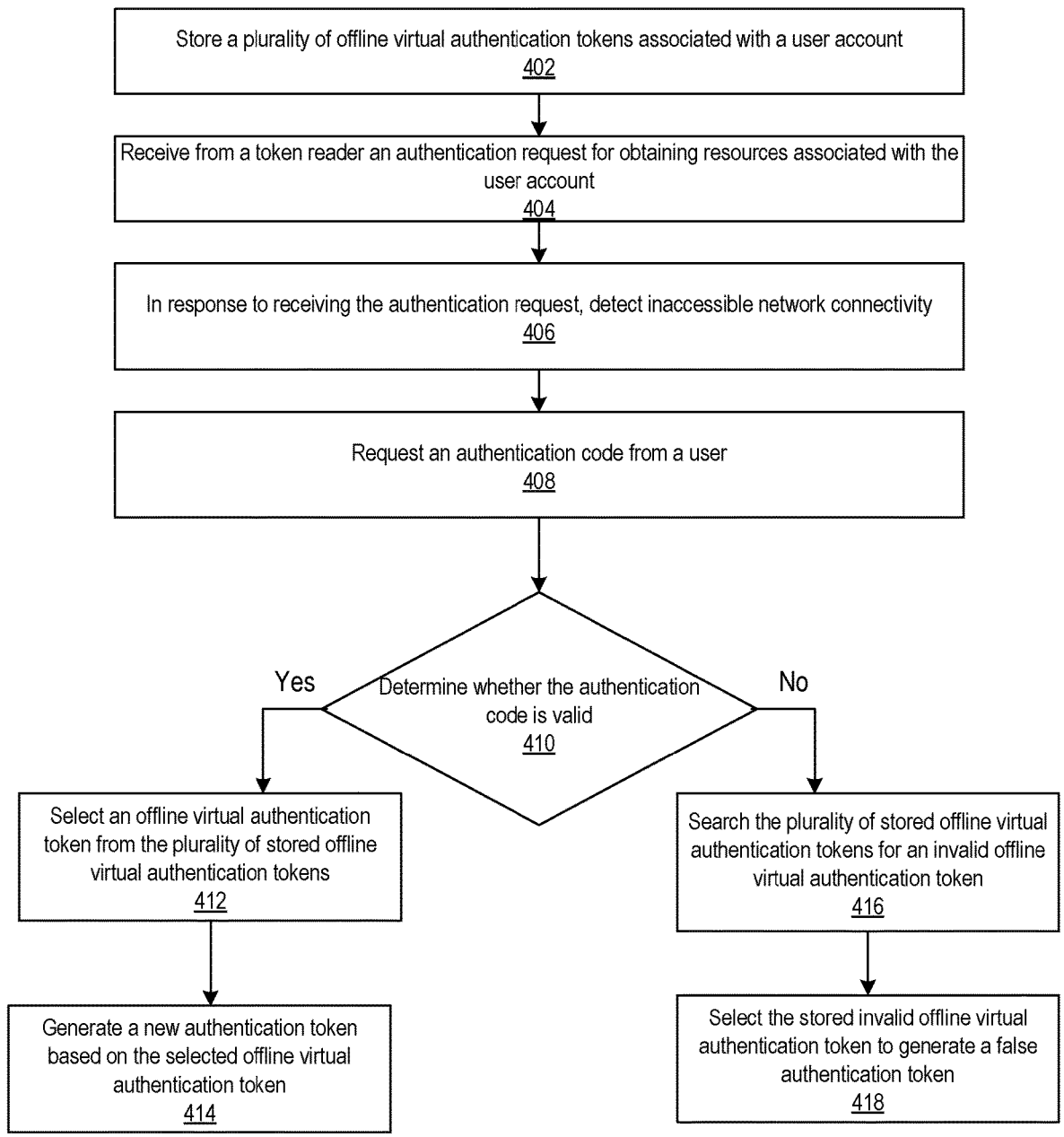
FIG. 4 shows a flowchart of the steps involved in leveraging offline virtual authentication tokens, in accordance with one or more embodiments.

FIG. 4 shows a flowchart of the steps involved in leveraging offline virtual authentication tokens, in accordance with one or more embodiments. For example, the system may use process 400 (e.g., as implemented on one or more system components described above) in order to allow users to utilize offline virtual card numbers.

At operation 402, process 400 (e.g., using one or more components described above) may store offline virtual authentication tokens associated with a user account. For example, the system may store a plurality of offline virtual authentication tokens associated with a user account. For example, the system may store preexisting virtual authentication tokens that require a network connection to gain access to an entity. For example, data node 104 may store a plurality of offline virtual authentication tokens associated with a user account in a database (e.g., database 216). By doing so, the system allows the user to easily store authentication tokens.

At operation 404, process 400 (e.g., using one or more components described above) may receive from a token reader an authentication request (e.g., authentication request 206) for obtaining resources associated with the user account. For example, the system may receive from a token reader (e.g., token reader 106 or token reader 204) an authentication request (e.g., authentication request 206) for obtaining resources associated with the user account. The authentication request may include an activity operator and activity data. The activity data includes location data. For example, communication subsystem 112 may receive from token reader 204 an authentication request 206 for obtaining resources associated with the user account using communication paths 328, 330, and 332. By doing so, the system ensures only users with permission can validate the authentication request.

At operation 406, process 400 (e.g., using one or more components described above) may, in response to receiving the authentication request, detect inaccessible network connectivity. For example, in response to receiving the authentication request (e.g., authentication request 206), the system may detect inaccessible network connectivity to determine whether a system is offline. For example, in response to receiving the authentication request 206, the authentication subsystem 114 may detect inaccessible network connectivity to determine whether the system is offline. By doing so, the system is able to determine the user is unable to access their plurality of stored authentication tokens.

At operation 408, process 400 (e.g., using one or more components described above) may request an authentication code (e.g., authentication code 214) from a user. For example, in response to determining the system is offline, the system may request an authentication code (e.g., authentication code 214) from a user. For example, in response to determining the system is offline, communication subsystem 112 may request authentication code 214 from a user using communication paths 328, 330, and 332. In some embodiments, authentication subsystem 114 may generate authentication code 214 based on a unique value. By doing so, the system provides extra security measures.

At operation 410, process 400 (e.g., using one or more components described above) may determine whether the authentication code (e.g., authentication code 214) is valid. For example, authentication subsystem 114 may determine whether the authentication code 214 is valid. By doing so, the system provides extra security measures.

At operation 412, process 400 (e.g., using one or more components described above) may select an offline virtual authentication token from the plurality of stored offline virtual authentication tokens. For example, in response to determining that the authentication code (e.g., authentication code 214) is valid, the system may select an offline virtual authentication token from the plurality of stored offline virtual authentication tokens associated with the user account. For example, in response to determining that the authentication code 214 is valid, token encryption subsystem 116 may select an offline virtual authentication token (e.g., token 218) from the plurality of stored offline virtual authentication tokens associated with the user account. In some embodiments, authentication subsystem 114 may determine whether authentication code 214 is valid by verifying the new authentication token has a valid checksum. By doing so, the system ensures fraudulent purchases associated with invalid authentication codes are not completed.

At operation 414, process 400 (e.g., using one or more components described above) may generate a new authentication token (e.g., authentication token 220) based on the selected offline virtual authentication token. For example, token encryption subsystem 116 may generate new authentication token 220 based on the stored offline virtual authentication token. By doing so, the system may allow the user access to an authentication token during a period of inaccessible network connectivity.

At operation 416, process 400 (e.g., using one or more components described above) may search the plurality of stored offline virtual authentication tokens for an invalid offline virtual authentication token. For example, authentication subsystem 114, in response to determining that the authentication code is invalid, may search the plurality of stored offline virtual authentication tokens for an invalid offline virtual authentication token. By doing so, the system ensures fraudulent purchases associated with invalid authentication codes are not completed.

At operation 418, process 400 (e.g., using one or more components described above) may select the stored invalid offline virtual authentication token to generate a false authentication token. For example, token encryption subsystem 116 may select the stored invalid offline virtual authentication token to generate a false authentication token. By doing so, the system ensures fraudulent purchases associated with invalid authentication codes are not completed.

In some embodiments, the system may decline the authentication request (e.g., authentication request 206). For example, communication subsystem 112 may detect the new authentication token (e.g., authentication token 220) includes an activity limit value. Authentication subsystem 114 may determine whether the activity data includes a value greater than the activity limit value. In response to determining the value is greater than the activity limit value, authentication subsystem 114 may decline the authentication request (e.g., authentication request 206).

In some embodiments, the system may accept the authentication request (e.g., authentication request 206). For example, communication subsystem 112 may detect the new authentication token (e.g., authentication token 220) includes a location threshold. Authentication subsystem 114 may determine whether the location data is within the location threshold. In response to determining the location data is within the location threshold, authentication subsystem 114 may accept the authentication request (e.g., authentication request 206).

In some embodiments, the system may generate a new plurality of offline virtual authentication tokens. For example, communication subsystem 112 may determine a threshold period based on a user preference. In response to detecting a threshold period has passed, authentication subsystem 114 may remove the plurality of offline virtual authentication tokens. Token encryption subsystem 116 may generate a new plurality of offline virtual authentication tokens. For example, the system may ask the user for a threshold period. The threshold period refers to how often the system should generate new offline virtual card numbers. For instance, the threshold period may refer to 30 days. After 30 days, the system will generate new offline virtual card numbers.

In some embodiments, the system may detect accessible network connectivity. For example, communication subsystem 112 may detect accessible network connectivity. The accessible network connectivity indicates the system is online. In response to detecting accessible network connectivity, the system may remove the new authentication token (e.g., authentication token 220) and the valid offline virtual authentication token from the user account. By doing so, the system may maintain its security.

In some embodiments, the system may retrieve a list of activities associated with the new authentication token (e.g., authentication token 220). For example, communication subsystem 112 may retrieve a list of activities associated with the new authentication token (e.g., authentication token 220). Each activity on the list of activities includes activity data. The system may determine whether the list of activities associated with the new authentication token (e.g., authentication token 220) is completed. Communication subsystem 112 may, in response to determining the list of activities is incomplete, forward the list of activities to an active authentication token associated with the user account using communication paths 328, 330, and 332.

In some embodiments, the system may remove the plurality of offline virtual authentication tokens. For example, communication subsystem 112 may receive, from a user, a notification indicating the user account is comprised. Token encryption subsystem 116, in response to receiving the notification, may remove the plurality of offline virtual authentication tokens from the user account. For example, the user can notify the server that their user account was hacked. The system may then deactivate and delete all the stored offline virtual authentication tokens from database 216.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims, which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: storing a plurality of offline virtual authentication tokens associated with a user account; receiving, from a token reader, an authentication request for obtaining resources associated with the user account, wherein the authentication request comprises activity data, and wherein the activity data comprises location data; in response to receiving the authentication request, detecting inaccessible network connectivity to determine the system is offline; in response to determining the system is offline, requesting an authentication code from a user; determining whether the authentication code received from the user is valid; in response to determining that the authentication code is valid, selecting an offline virtual authentication token from the plurality of stored offline virtual authentication tokens associated with the user account; generating a new authentication token based on the selected offline virtual authentication token; and transmitting the new authentication token to the token reader in response to receiving the authentication request.

2. A method comprising: storing a plurality of offline virtual authentication tokens associated with a user account; receiving from a token reader an authentication request for obtaining resources associated with the user account, wherein the authentication request comprises an activity operator and activity data, and wherein the activity data comprises location data; in response to receiving the authentication request, detecting inaccessible network connectivity to determine a system is offline; in response to determining the system is offline, requesting an authentication code from a user; determining whether the authentication code is valid; in response to determining that the authentication code is valid, selecting an offline virtual authentication token from the plurality of stored offline virtual authentication tokens associated with the user account; and generating a new authentication token based on the selected offline virtual authentication token.

3. A method comprising: storing a plurality of offline virtual authentication tokens associated with a user account; receiving from a token reader an authentication request for obtaining resources associated with the user account, wherein the authentication request comprises an activity operator and activity data, and wherein the activity data comprises location data; in response to receiving the authentication request, detecting inaccessible network connectivity to determine a system is offline; in response to determining the system is offline, requesting an authentication code from a user; in response to determining that the authentication code is valid, selecting an offline virtual authentication token from the plurality of stored offline virtual authentication tokens associated with the user account; and generating a new authentication token based on the selected offline virtual authentication token.

4. The method of any one of the preceding embodiments, further comprising: in response to determining that the authentication code is not valid, generating a false authentication token having an invalid checksum; and transmitting the false authentication token to the token reader to signal malicious activity in response to receiving the authentication request.

5. The method of any one of the preceding embodiments, further comprising: in response to determining that the authentication code is invalid, searching the plurality of stored offline virtual authentication tokens associated with the user account for an invalid offline virtual authentication token; and selecting the stored invalid offline virtual authentication token to generate a false authentication token, wherein the invalid offline virtual authentication token comprises an invalid checksum.

6. The method of any one of the preceding embodiments, further comprising: detecting the new authentication token comprises an activity limit value; determining whether the activity data comprises a value greater than the activity limit value; and in response to determining the value is greater than the activity limit value, declining the authentication request.

7. The method of any one of the preceding embodiments, further comprising: detecting the new authentication token comprises a location threshold; determining whether the location data is within the location threshold; and in response to determining the location data is within the location threshold, accepting the authentication request.

8 The method of any one of the preceding embodiments, further comprising: determining a threshold period based on a user preference; and in response to detecting a threshold period has passed, removing the plurality of offline virtual authentication tokens; and generating a new plurality of offline virtual authentication tokens.

9. The method of any one of the preceding embodiments, further comprising: detecting accessible network connectivity, wherein the accessible network connectivity indicates the system is online; and in response to detecting accessible network connectivity, removing the new authentication token and the valid offline virtual authentication token from the user account.

10. The method of any one of the preceding embodiments, wherein removing the new authentication token from the user account further comprises: retrieving a list of activities associated with the new authentication token, wherein each activity on the list of activities comprises activity data; determining whether the list of activities associated with the new authentication token is completed; and in response to determining the list of activities is incomplete, forwarding the list of activities to an active authentication token associated with the user account.

11. The method of any one of the preceding embodiments, further comprising: receiving, from a user, a notification indicating the user account is comprised; and in response to receiving the notification, removing the plurality of offline virtual authentication tokens from the user account.

12. The method of any one of the preceding embodiments, further comprising generating the authentication code based on a unique value.

13. The method of any one of the preceding embodiments, wherein determining whether the authentication code is valid further comprises verifying the new authentication token has a valid checksum.

14. A tangible, non-transitory, machine-readable medium storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for leveraging offline virtual authentication tokens during periods of inaccessible network connectivity, comprising:
one or more processors; and
one or more non-transitory, computer-readable media storing instructions that when executed by the one or more processors cause operations comprising:
storing a plurality of offline virtual authentication tokens associated with a user account;
receiving, from a token reader, an authentication request for obtaining resources associated with the user account, wherein the authentication request comprises activity data, and wherein the activity data comprises location data;
in response to receiving the authentication request, detecting inaccessible network connectivity to determine the system is offline;
in response to determining the system is offline, requesting an authentication code from a user;
determining whether the authentication code received from the user is valid;
in response to determining that the authentication code is valid, selecting an offline virtual authentication token from the plurality of stored offline virtual authentication tokens associated with the user account;
generating a new authentication token based on the selected offline virtual authentication token; and
transmitting the new authentication token to the token reader in response to receiving the authentication request.

2. The system of claim 1, further comprising:
in response to determining that the authentication code is not valid, generating a false authentication token having an invalid checksum; and
transmitting the false authentication token to the token reader to signal malicious activity in response to receiving the authentication request.

3. A method for leveraging offline virtual authentication tokens, the method comprising:
storing a plurality of offline virtual authentication tokens associated with a user account;
receiving from a token reader an authentication request for obtaining resources associated with the user account, wherein the authentication request comprises an activity operator and activity data, and wherein the activity data comprises location data;
in response to receiving the authentication request, detecting inaccessible network connectivity to determine a system is offline;
in response to determining the system is offline, requesting an authentication code from a user;
determining whether the authentication code is valid;
in response to determining that the authentication code is valid, selecting an offline virtual authentication token from the plurality of stored offline virtual authentication tokens associated with the user account; and
generating a new authentication token based on the selected offline virtual authentication token.

4. The method of claim 3, further comprising:
in response to determining that the authentication code is invalid, searching the plurality of stored offline virtual authentication tokens associated with the user account for an invalid offline virtual authentication token; and
selecting the stored invalid offline virtual authentication token to generate a false authentication token, wherein the invalid offline virtual authentication token comprises an invalid checksum.

5. The method of claim 3, further comprising:
detecting the new authentication token comprises an activity limit value;
determining whether the activity data comprises a value greater than the activity limit value; and
in response to determining the value is greater than the activity limit value, declining the authentication request.

6. The method of claim 3, further comprising:
detecting the new authentication token comprises a location threshold;
determining whether the location data is within the location threshold; and
in response to determining the location data is within the location threshold, accepting the authentication request.

7. The method of claim 3, further comprising:
determining a threshold period based on a user preference;
in response to detecting a threshold period has passed, removing the plurality of offline virtual authentication tokens; and
generating a new plurality of offline virtual authentication tokens.

8. The method of claim 3, further comprising:
detecting accessible network connectivity, wherein the accessible network connectivity indicates the system is online; and
in response to detecting accessible network connectivity, removing the new authentication token and the valid offline virtual authentication token from the user account.

9. The method of claim 8, wherein removing the new authentication token from the user account further comprises:
retrieving a list of activities associated with the new authentication token, wherein each activity on the list of activities comprises activity data;
determining whether the list of activities associated with the new authentication token is completed; and
in response to determining the list of activities is incomplete, forwarding the list of activities to an active authentication token associated with the user account.

10. The method of claim 3, further comprising:
receiving, from a user, a notification indicating the user account is comprised; and
in response to receiving the notification, removing the plurality of offline virtual authentication tokens from the user account.

11. The method of claim 3, further comprising generating the authentication code based on a unique value.

12. The method of claim 3, wherein determining whether the authentication code is valid further comprises verifying the new authentication token has a valid checksum.

13. One or more non-transitory, computer-readable storage media storing instructions that when executed by one or more processors cause operations comprising:
- storing a plurality of offline virtual authentication tokens associated with a user account;
- receiving from a token reader an authentication request for obtaining resources associated with the user account, wherein the authentication request comprises an activity operator and activity data, and wherein the activity data comprises location data;
- in response to receiving the authentication request, detecting inaccessible network connectivity to determine a system is offline;
- in response to determining the system is offline, requesting an authentication code from a user;
- in response to determining that the authentication code is valid, selecting an offline virtual authentication token from the plurality of stored offline virtual authentication tokens associated with the user account; and
- generating a new authentication token based on the selected offline virtual authentication token.

14. The one or more non-transitory, computer-readable storage media of claim 13, wherein the instructions further cause the one or more processors to perform operations comprising:
- in response to determining that the authentication code is invalid, searching the plurality of stored offline virtual authentication tokens associated with the user account for an invalid offline virtual authentication token; and
- selecting the stored invalid offline virtual authentication token to generate a false authentication token, wherein the invalid offline virtual authentication token comprises an invalid checksum.

15. The one or more non-transitory, computer-readable storage media of claim 13, wherein the instructions further cause the one or more processors to perform operations comprising:
- detecting the new authentication token comprises an activity limit value;
- determining whether the activity data comprises a value greater than the activity limit value; and
- in response to determining the value is greater than the activity limit value, declining the authentication request.

16. The one or more non-transitory, computer-readable storage media of claim 13, wherein the instructions further cause the one or more processors to perform operations comprising:
- detecting the new authentication token comprises a location threshold;
- determining whether the location data is within the location threshold; and
- in response to determining the location data is within the location threshold, accepting the authentication request.

17. The one or more non-transitory, computer-readable storage media of claim 13, wherein the instructions further cause the one or more processors to perform operations comprising:
- determining a threshold period based on a user preference;
- in response to detecting a threshold period has passed, removing the plurality of offline virtual authentication tokens; and
- generating a new plurality of offline virtual authentication tokens.

18. The one or more non-transitory, computer-readable storage media of claim 13, wherein the instructions further cause the one or more processors to perform operations comprising:
- detecting accessible network connectivity, wherein the accessible network connectivity indicates the system is online; and
- in response to detecting accessible network connectivity, removing the new authentication token and the valid offline virtual authentication token from the user account.

19. The one or more non-transitory, computer-readable storage media of claim 18, wherein removing the new authentication token from the user account further comprises:
- retrieving a list of activities associated with the new authentication token, wherein each activity on the list of activities comprises activity data;
- determining whether the list of activities associated with the new authentication token is completed; and
- in response to determining the list of activities is incomplete, forwarding the list of activities to an active authentication token associated with the user account.

20. The one or more non-transitory, computer-readable storage media of claim 13, wherein the instructions further cause the one or more processors to perform operations comprising:
- receiving, from a user, a notification indicating the user account is comprised; and
- in response to receiving the notification, removing the plurality of offline virtual authentication tokens from the user account.

* * * * *